(12) United States Patent
Johnston (10) Patent No.: US 11,046,044 B2
(45) Date of Patent: Jun. 29, 2021

(54) RECON MARINE VESSEL

(71) Applicant: Daniel D. Johnston, Redington Beach, FL (US)

(72) Inventor: Daniel D. Johnston, Redington Beach, FL (US)

( * ) Notice: Subject to any disclaimer, the term of this patent is extended or adjusted under 35 U.S.C. 154(b) by 0 days.

(21) Appl. No.: 16/615,740

(22) PCT Filed: May 26, 2017

(86) PCT No.: PCT/US2017/021387
§ 371 (c)(1),
(2) Date: Nov. 21, 2019

(87) PCT Pub. No.: WO2018/217183
PCT Pub. Date: Nov. 29, 2018

(65) Prior Publication Data
US 2020/0086951 A1    Mar. 19, 2020

(51) Int. Cl.
*B63B 7/00* (2020.01)
*B32B 7/00* (2019.01)

(52) U.S. Cl.
CPC ............ *B32B 7/00* (2013.01); *B63B 2241/24* (2013.01)

(58) Field of Classification Search
CPC .............................. B63B 7/00; B63B 2241/24
See application file for complete search history.

(56) References Cited

U.S. PATENT DOCUMENTS

| | | | | |
|---|---|---|---|---|
| 3,752,111 | A * | 8/1973 | Meynier, Jr. ........... | B63H 5/125 440/56 |
| 5,359,952 | A * | 11/1994 | Klundt .................... | B63B 15/00 114/72 |
| 2010/0242825 | A1* | 9/2010 | Seism ...................... | B63B 1/20 114/289 |
| 2020/0086951 | A1* | 3/2020 | Johnston .................. | B63B 7/00 |

OTHER PUBLICATIONS https://www.marinelog.com/shipyards/shipyard-news/eastern-to-build-four-inland-towboats-for-latin-america/ (Year: 2015).*

* cited by examiner

*Primary Examiner* — S. Joseph Morano
*Assistant Examiner* — Jovon E Hayes
(74) *Attorney, Agent, or Firm* — Cargill & Associates, PLLC; Lynn E. Cargill (57) ABSTRACT

The present invention discloses a marine vessel with a monohedral v-shaped hull bow portion blending into catamaran hull sponsons, a center tunnel and individual terminal tunnels on each of the sponsons. This new hull design is capable of high speeds to travel to a desired location, while still providing platform stability and shallow draft of the catamaran shaped aft portion. A removable hull transom diffuser gate and a removable side hull deflector plate may be retracted and/or lowered to reduce the signature of the vessel underway. A retractable cockpit may be included to permit stacking of the marine vessels in order to allow multiple vessels to simultaneously be shipped in a C-130 or C-17 cargo plane to a distant location. This retractable cockpit may include a multi-positional pilot house which

(Continued)

can be elevated for rough sea conditions with hinged windshield and side plates for protection from waves for the operators.

1 Claim, 14 Drawing Sheets

RECON MARINE VESSEL

BACKGROUND OF THE INVENTION

1. Field of the Invention

The present invention relates to a marine vessel, and more particularly, aspects of the invention relate to a recon insertion craft.

2. Description of the Prior Art

Conventional marine vessels are well known in the art, including one of the most common types of monohull construction, a vessel that includes a single hull design, a catamaran hull, or a pickle fork type hull. The v-shaped monohull is especially suited for cutting through high seas, while the catamaran hull is traditionally used for platform stability and the pickle fork design is amenable to high speeds. In some vessel hull designs, a low draft is desirable so that a boat can run in shallow waters, whereas monohull semi-displacement designs are better for deeper waters.

However, practitioners of those inventions have become aware of certain problems which are presented by those prior art inventions. One particular problem that has plagued users has been that the boat is either designed for deep waters or shallow waters, but not both at the same time. There are complexities which give rise to stability problems and speed issues.

It would be desirable to the marine industry if there was provided a fast yet stable vessel. In addition, some applications for marine vessels are desirable for military applications that are stealthy and provide low signature so as not to draw attention from the enemy when the boat is in operation.

SUMMARY OF THE INVENTION

In accordance with the above-noted desires of the industry, the present invention provides various aspects, including a monohedral forward hull blending to a catamaran hull at approximately from about 20% to 60% of the full length from the bow to aft. This includes essentially a v-shaped monohull emanating from the bow aft midships terminating in a catamaran type hull with two sponsons. This overcomes many of the aforementioned problems with the prior art because it provides the benefits of a monohull in heavy seas with the platform stability of a catamaran hull.

A first aspect of the present invention includes certain features including the outboard side plates of the catamaran shape blending smoothly to the monohull shape in an integral fashion, while the inboard plates of the catamaran shapes travel inwardly from the monohull plates. The space between the catamaran hulls is connected with a closed tunnel allowing air to travel therebetween.

Another aspect of the invention has other features including lack of any dimensional limitation on this hull form. The ratios of monohull formation to catamaran hull formation are most advantageously between approximately 20% to 40% of the full vessel length from bow to aft.

The invention is particularly useful for applications of military vehicles such as recon insertion craft as it can be used at high speeds to travel to a desired location, and utilizing platform stability and shallow draft of the catamaran shaped aft portion.

For applications of recon insertion craft, it is also desirable for a low signature vessel so as not to attract attention. In that regard, an additional feature includes a deflection plate essentially running the length of the vessel extending downwardly from the integral side hull. This deflection plate forces the water downwardly during operation so that the side spray created by the v-hull shape is minimized.

Yet another aspect of the present invention includes a retractable pilothouse so that one of these recon insertion crafts can be stacked on top of the other and transported on a C-130 or a C-17 cargo plane to a location where both of the boats are unloaded. Then one of the boats is reloaded onto the cargo plane, whether it be a C-130 or a C-17, and that boat is then transported to its desired end location and dropped off. If the drop off point is over water, the boat that has been reloaded onto the C-130 or C-17 may have been fitted with parachutes for transporting the single-loaded vessel craft to a desired location and dropped out of the back of the cargo plane. The parachutes allow the craft to drift down to the water unharmed. Presumably, the boat pilot and crew would also parachute down to the boat. The advantage that this design allows, is that two boats can be transported from the United States to a faraway land instead of just one craft, saving time, fuel and money for operating expenses. An objective of the United States military is to procure such a stackable boat such that once the cargo plane containing the stacked boats arrives at a friendly location nearby the ultimately desired location, both marine craft can be unloaded. One of the craft can be re-loaded and then flown to the ultimate desired location and that single craft can then be dropped down onto the water. This will save a tremendous amount of time and money by providing transport of two boats instead of just one.

The above described insertion craft, after it has been dropped into the water, can be piloted into shallow waters in a stealthy manner to avoid detection by an enemy. The stealthy design of the boat has several advantages for being stealthy because it does not produce any appreciable signature. In addition to the fact that the present boat has an angled hull exterior which exhibits little to no radar signature, certain aspects include an optional water deflector plate for reducing or preventing side spray, and an extendable diffuser gate off the transom for diffusing propeller spray when the vessel is underway, thereby limiting or eliminating a signature that can be detected by the enemy. Such a low signature vessel is highly desirable.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein.

DETAILED DESCRIPTION OF THE INVENTION

Figure 1:
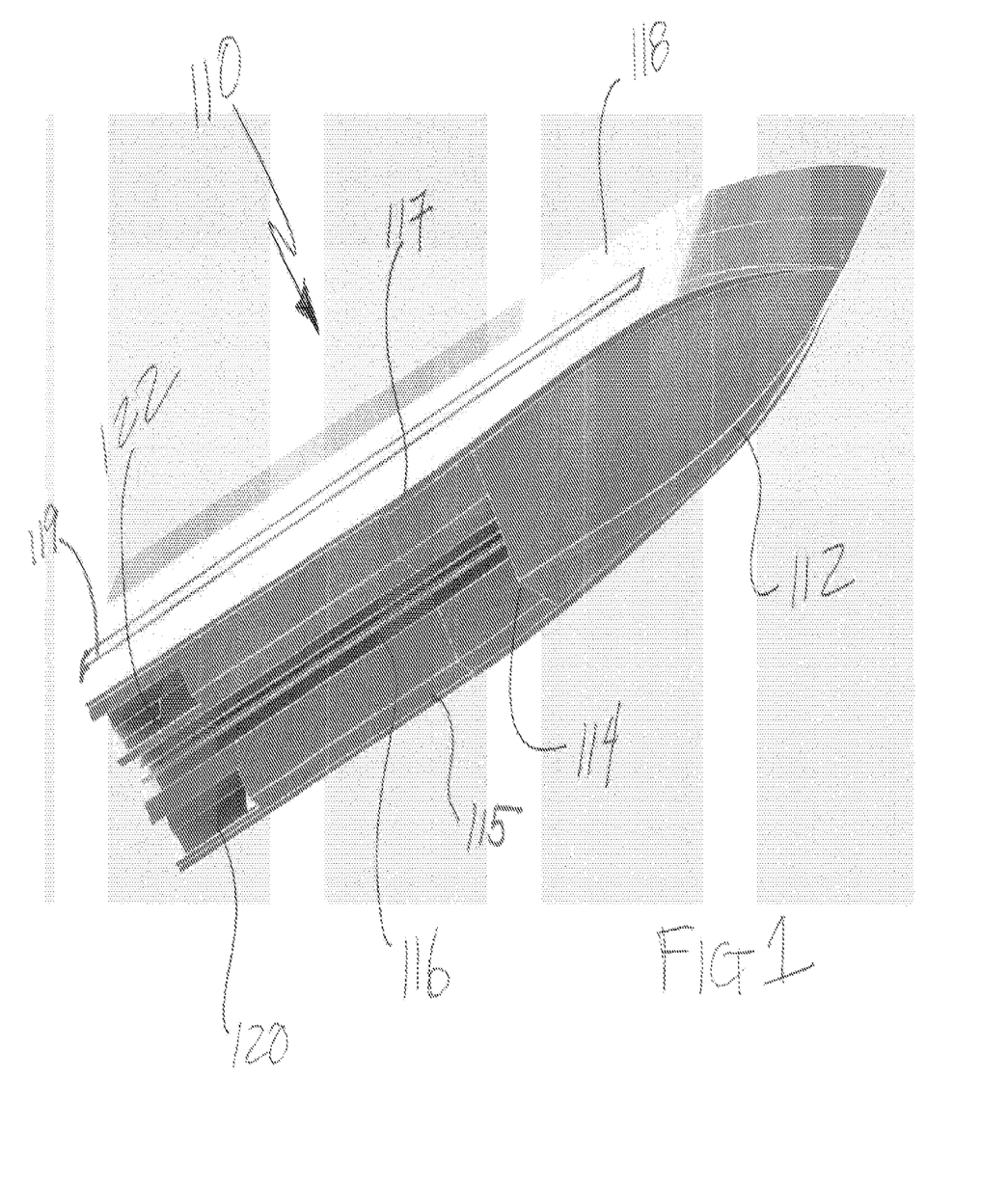
FIG. 1 is a bottom perspective view of a marine vessel made in accordance with the present invention.

Referring now to the drawings in detail, FIG. 1 is a bottom perspective view of a marine vessel generally indicated by the numeral 110, which also includes at least one portion of a v-hull 112. The distal end plate 114 of the v-hull 112 is aft of the bow of the vessel and incorporates a flat terminal end. A hull tunnel 116 begins immediately aft of the terminal end 114 and defines a port and starboard sponson 115 and 117, respectively. Formed into the distal portion of port and starboard sponsons 115 and 117 are port hull tunnel 120 and starboard hull tunnel 122. A water spray deflector plate 119 is removably attachable to side hull 118 and is utilized for deflecting water spray downwardly back into the water to reduce the signature. As the water spray deflector plate is an optional feature, it can be removed for non-stealthy applications.

Looking next to FIG. 2, again the marine vessel is generally denoted by numeral 110 and includes a bow portion v-hull 112 terminating in v-hull end plate 114. Starboard and port sponsons, 117 and 115 individually terminate at starboard and port end plates 121 and 123, respectively. Aft of end plates 121 and 123 are starboard and port hull tunnels 122 and 120, respectively. Within these hull tunnels 122 and 120 are housed drive shafts 130 and 124, respectively as starboard shaft and port shaft for attaching starboard propeller 132 and port propeller 126. starboard hull tunnel 122 and port hull tunnel 120 also house port rudder 128 and starboard rudder 134.

Figure 2:
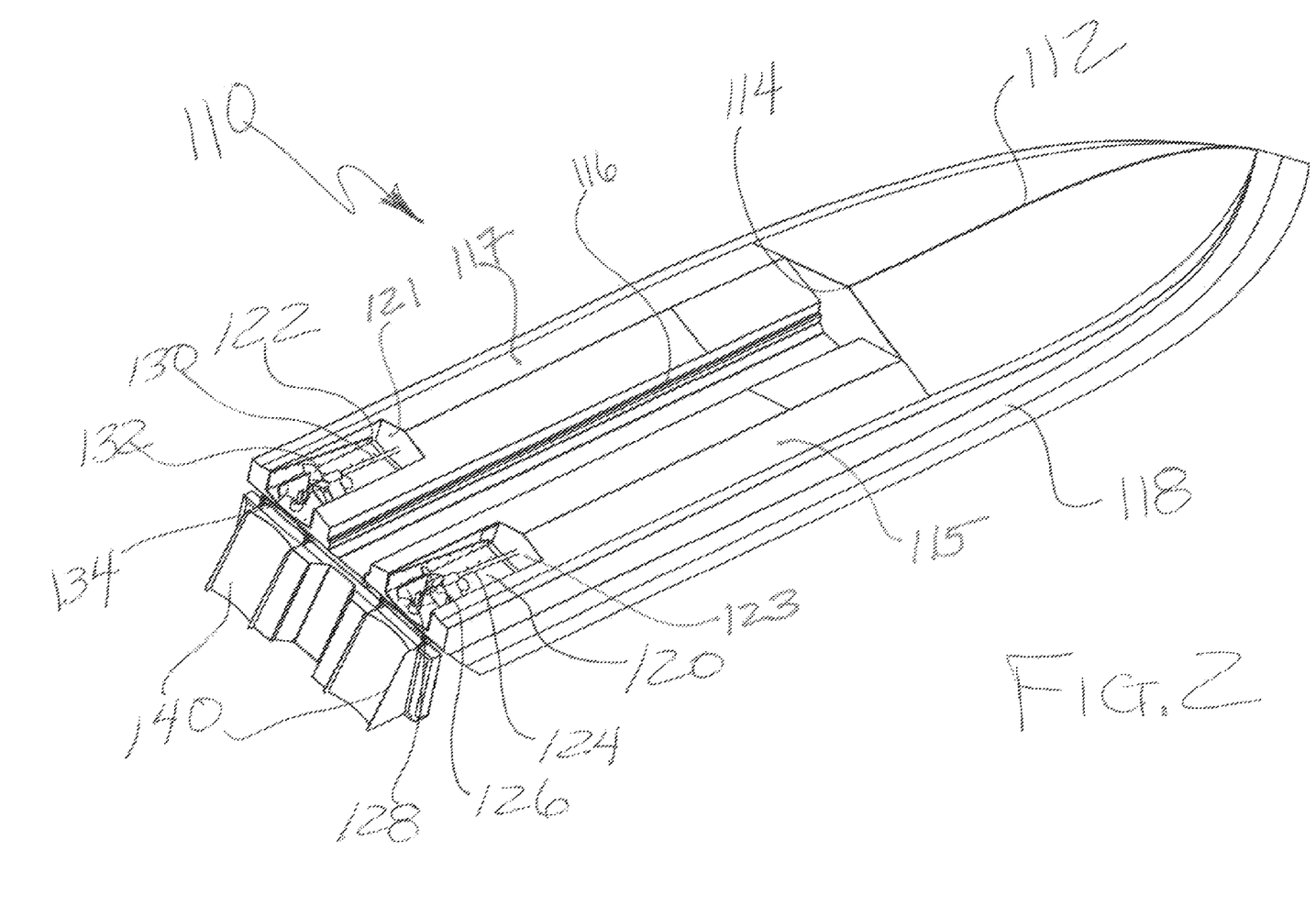
FIG. 2 is a bottom perspective view.

A retractable diffuser gate 140 is an optional piece for further reducing the signature of the vessel underway. When extended in the "down" position, water spray from the wake of a vessel is dispersed downwardly back into the water. A wake normally accompanies a vessel when underway, and it becomes highly visible for long distances. In order to minimize the wake of a vessel, the present diffuser gate has been found to be very helpful. However, when the diffuser gate is in the "up" position, the vessel can achieve higher speeds, on the order of from about three to five knots greater than when the diffuser gate 140 is in its lowered position. In combination, this monohedral multi-hull design vessel along with the optional removable deflector plate 119 and a lowered diffuser gate 140 yields a vessel with a very low signature.

ELEMENT LIST

| | |
|---|---|
| 110 | Monocat hull |
| 112 | V-Hull |
| 114 | V-Hull end plate |
| 115 | Port sponson |
| 116 | Center tunnel |
| 117 | Starboard sponson |
| 118 | Hull side |
| 119 | Water spray deflector plate |
| 120 | Port hull tunnel |
| 121 | Starboard tunnel end plate |
| 122 | Starboard hull tunnel |
| 123 | Port tunnel end plate |
| 124 | Port shaft |
| 126 | Port propeller |
| 128 | Port rudder |
| 130 | Starboard shaft |
| 132 | Starboard propeller |
| 134 | Starboard rudder |
| 140 | Diffuser gate |

Figure 3:
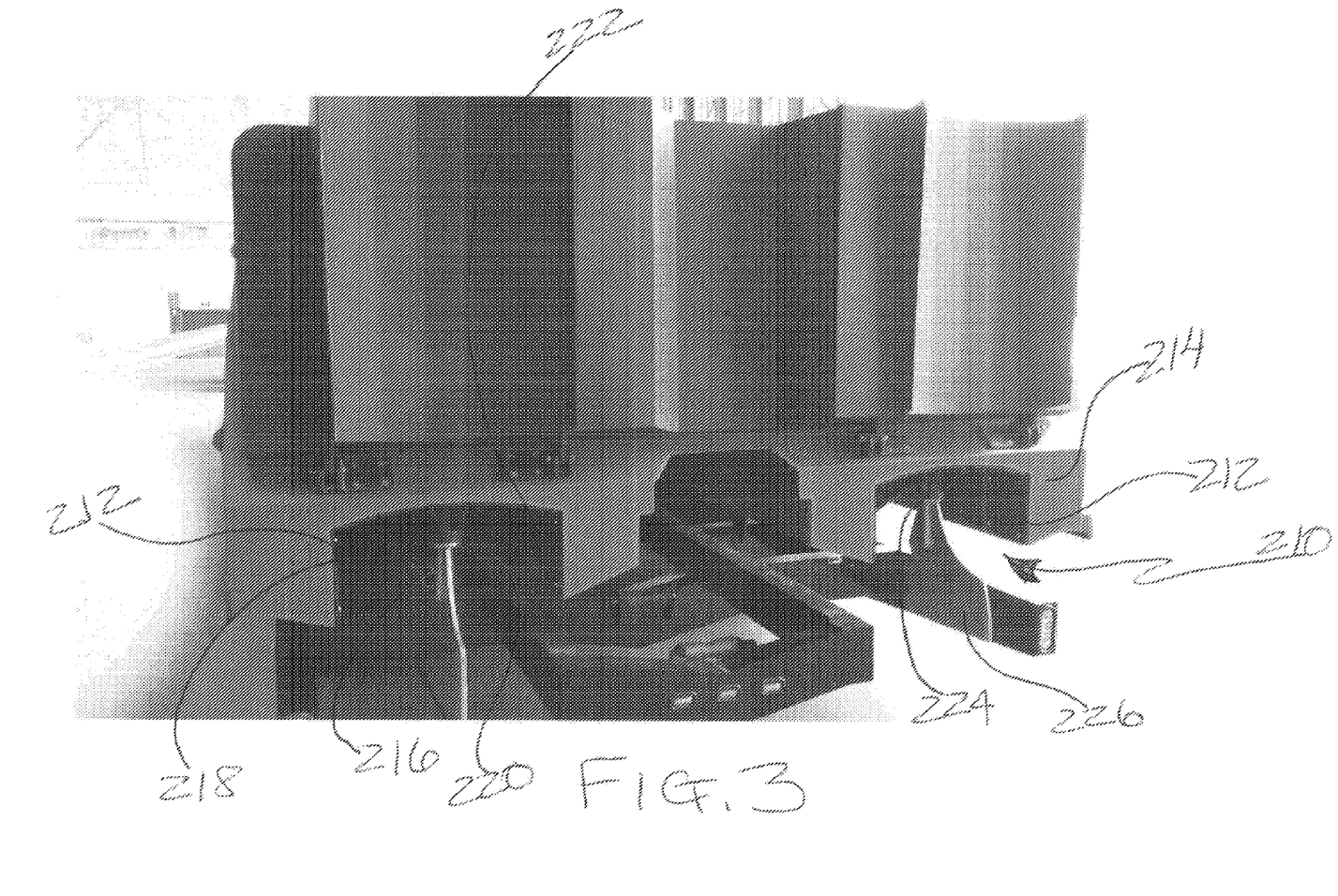
FIG. 3 is a rear elevational view of a removable tunnel surface drive.

FIG. 3 is a side elevational view of a new and novel tunnel surface drive generally denoted by numeral 210, including a 3-sided pocket 212 recessed into a transom 214 within the hull. Said 3-sided pocket 212 is closed within the sponson, with the drive shaft 216 protruding from the transmission for the motor. A front plate 218 of the pocket is sealed with a watertight bearing (shown as a PSS type). Diagonal metal plates 220 support rudder shaft 224 within metal cage 222. Rudder shaft 224 terminates in rudder 226 for controlling the navigational direction of the vessel. Drive shaft 216 terminates in an aft end that is supported by the diagonal metal plates 220, which are attached between a drive shaft 216 and a barrel surrounding the propeller drive shaft 216 and the fabricated metal cage 222, which lines the interior surface of the 3-sided pocket 212. In this view, a diffuser gate is shown in its retracted position extending upwardly from the transom 214 of the vessel.

Figure 4:
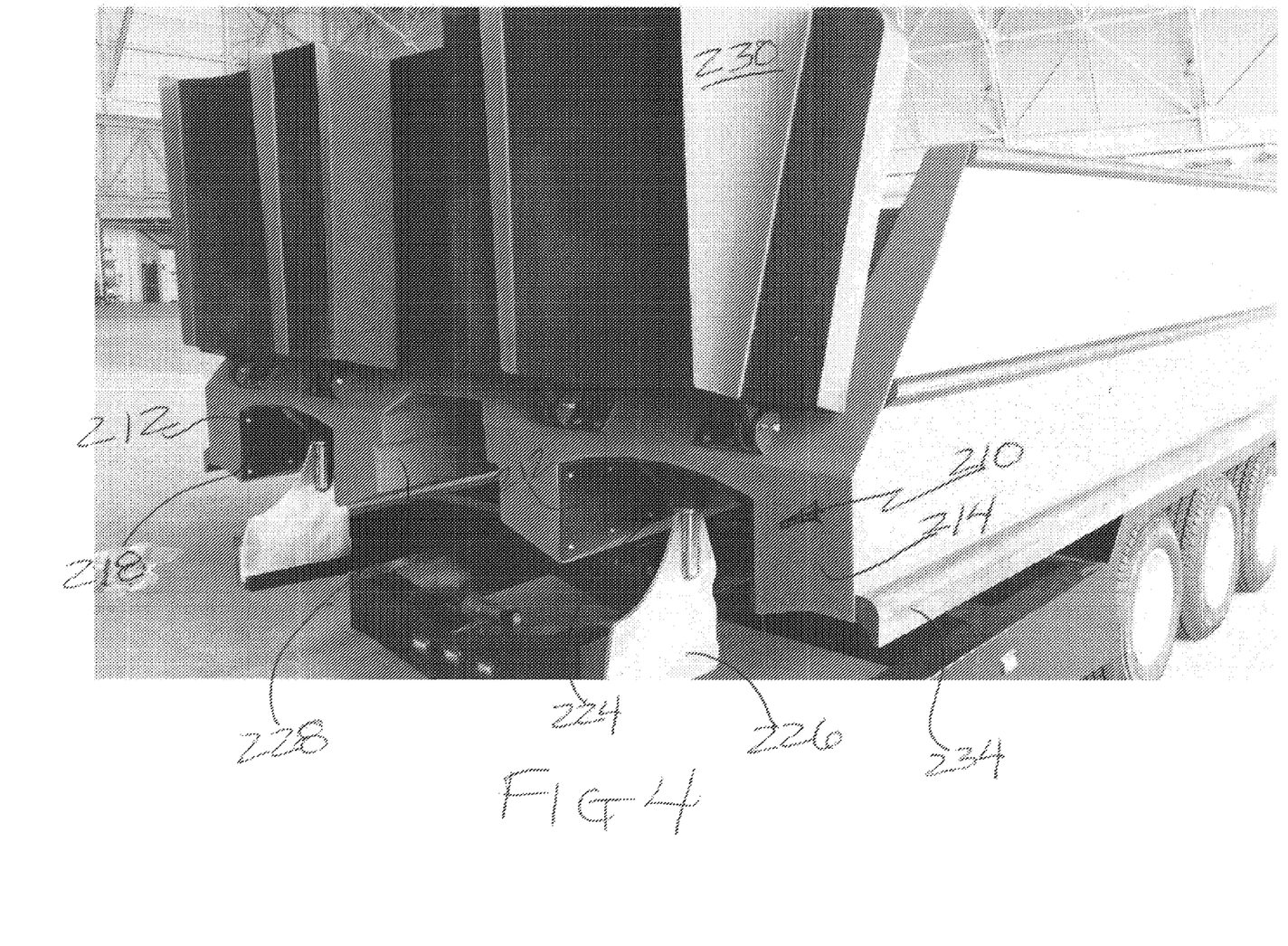
FIG. 4 is a rear elevational perspective view with relative rudder placement.

FIG. 4 is another perspective view of the transom 214 of the marine vessel. Again, removable tunnel surface drive 210 is shown having a removable 3-sided fabricated pocket 212, which can be easily removed in the event of damage. Within 20 minutes or so, pocket 212 can be removed and replaced so that this marine vessel can once again be on its way quickly. For military operations, the ability to escape a situation quickly is paramount. Extending downwardly from 3-sided pocket 212 is rudder shaft 224 terminating in rudder 226, which also protects the propeller (not shown). Center tunnel 228 preferably includes a lapstrake configuration. Diffuser gate 230 is hingeably mounted to transom 214 and is shown in its upwardly extending position, ready to be lowered into place to reduce its signature when underway.

Still referring to FIG. 4, there is shown an optional deflector plate 234 for directing water spray downwardly to reduce the signature of the marine vessel underway. Deflector plate 234 is optionally removably attached to the lower side hull panel and is not necessary when a signature for this vessel is unimportant. When installed in this position as shown in FIG. 4, side spray that is commonly generated when a vessel is underway is deflected downward, rather than outward, thereby reducing the signature of the vessel overall, making detection less likely from an enemy.

Once again referring to FIG. 4, metal cage 222 holds a watertight bearing at the top aft center location of the removable tunnel surface drive 3-sided pocket 212. Said watertight bearing (not visible in this view) contains the rudder shaft 224 holding rudder 226. The propeller (not shown in this view) mounts directly aft of the propeller drive shaft 216 of FIG. 3. Drive shaft 216 is mounted to the 3-sides pocket metal cage 212, and the rudder 226 directly aft. When installed, the propeller will be located at an altitude within the 3-sided pocket 212 such that when at top speed the top of the propeller is clear of water, which will accomplish surface piercing. Surface piercing is known to increase speed and has been used in racing circuits for a long time. However, it is new and novel in the manner in which the propeller will be attached in order to provide maximum surface piercing.

One of the advantages of the present invention is that this entire drive assembly may be easily removed by merely removing rudder 226, removing the propeller and then sliding out the propeller drive shaft 216 in order to effect a quick and easy repair within about 20 minutes. 3-sided pocket 212 may be quickly unbolted for maintenance or it may be replaced if damaged. The present removable tunnel surface drive 210 is intended to eliminate thrust and noise signature typically created by a vessel, thereby rendering this vessel more stealthy than other like vessels. In the event of a failure, an operator of the vessel can effect a full repair, allowing the vessel to become underway in a very short amount of time.

Figure 5:
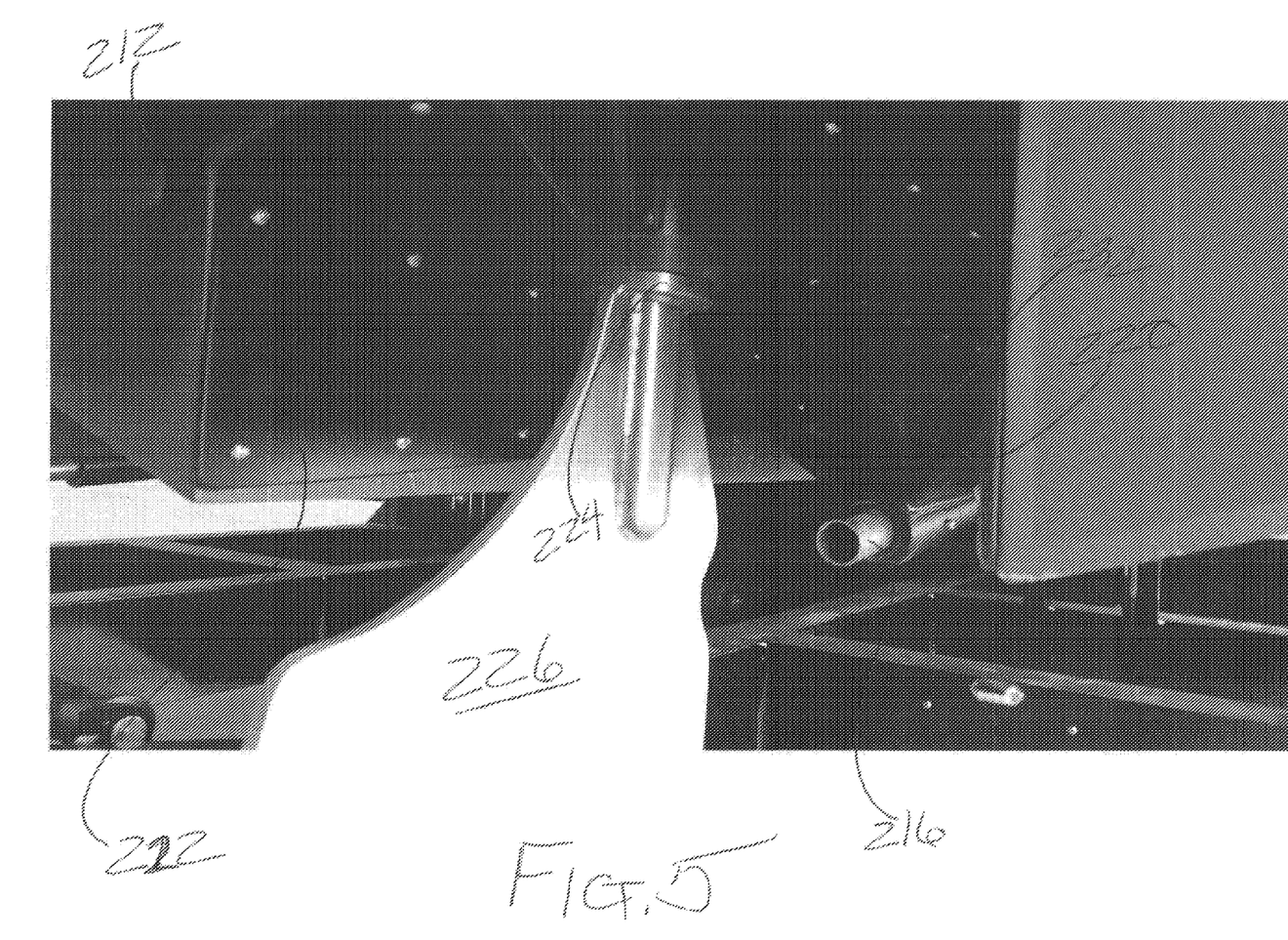
FIG. 5 is a close-up of the removable tunnel surface drive without propeller.

FIG. 5 is a close-up view of the rudder configuration of FIG. 4, and more clearly shows the bolt on configuration of 3-sided pocket 212. Propeller drive shaft 216 is shown without the propeller but does show the diagonal metal plates 220 for supporting rudder shaft 224 terminating in rudder 226. A semi-rigid tube 232 is shown for aiding the vessel to provide an air outlet for cavitation of the propeller at low speeds. Once the vessel has achieved a higher RPM, the air tube is located above the water line and is no longer in service.

Figure 6:
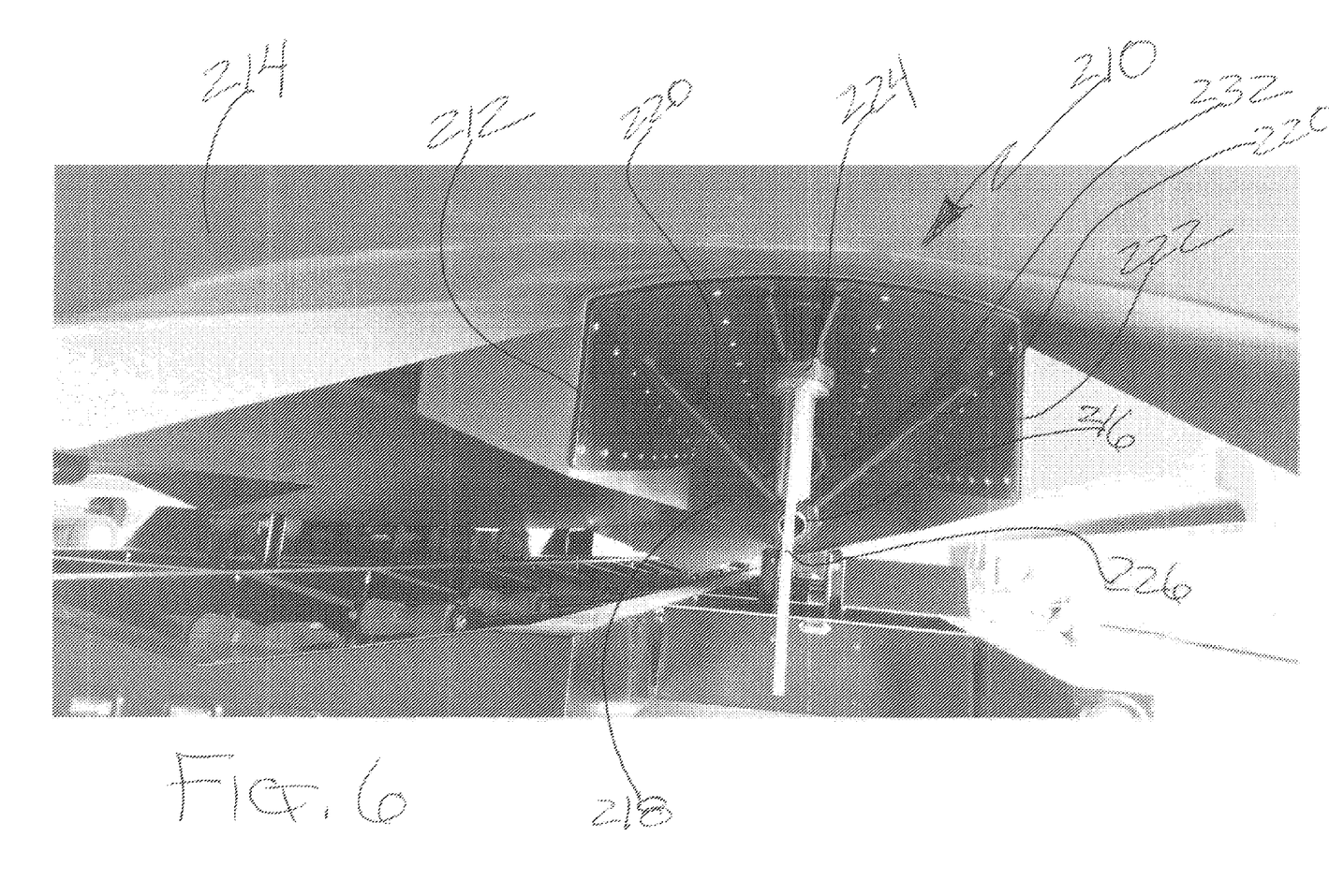
FIG. 6 is a real elevational view of the tunnel surface drive pocket.

FIG. 6 is a rear elevational view more clearly illustrating the 3-sided pocket 212 and its bolt on configuration included within the entire removable tunnel surface drive 210. As can be seen, under transom 214 is attached the 3-sided pocket 212 with supporting diagonal metal plates 220 holding the propeller drive shaft 216 in place. Aft of propeller drive shaft 216 is rudder shaft 224 terminating in rudder 226. Semi-rigid tube 232 is located above propeller drive shaft 216 in a relative placement for providing air for cavitation of the propeller at low speeds. We see that front plate of the pocket 218 is further toward the midships, thereby defining the tunnel into which this tunnel surface drive 210 is inserted.

ELEMENT LIST

| 210 | Removable tunnel surface drive |
| 212 | 3-sided pocket |
| 214 | Transom |
| 216 | Drive shaft |
| 218 | Front plate of the pocket |
| 220 | Diagonal metal plates |
| 222 | Metal cage |
| 224 | Rudder shaft |
| 226 | Rudder |
| 228 | Center tunnel |
| 230 | Diffuser gate |
| 232 | Semi-rigid tube |
| 234 | Water spray deflector |

Figure 7:
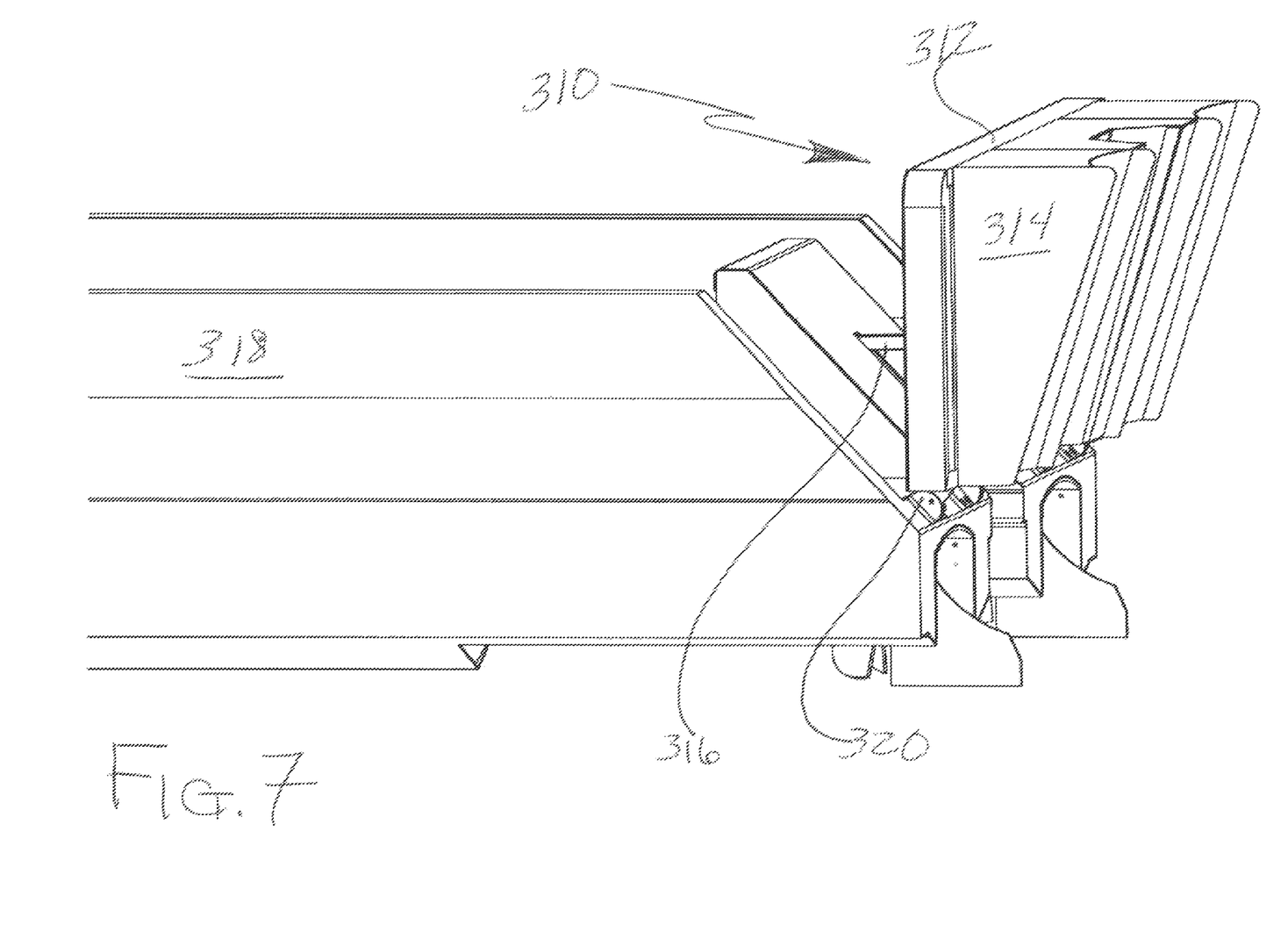
FIG. 7 is a side elevational perspective view of a diffuser gate made in accordance with the present invention in the retracted position.

FIG. 7 is a rear elevational perspective view of a diffuser gate made in accordance with the present invention, generally denoted by numeral 310, including an elevating transom platform 312, inverted gutters 314, and a hydraulic strut 316 for extending and retracting diffuser gate 310. Inverted gutters 314, when lowered into position, reduce the water spray put out by the propellers when the vessel is underway to significantly reduce the signature of the vessel so as not to attract attention of an enemy. Hydraulic strut 316 extends and retracts platform 312 and is preferably hingeably mounted by hinge pins 320 onto the transom of the vessel 318. In this view, diffuser gates are shown in their fully retracted, upwardly extending position.

Figure 8:
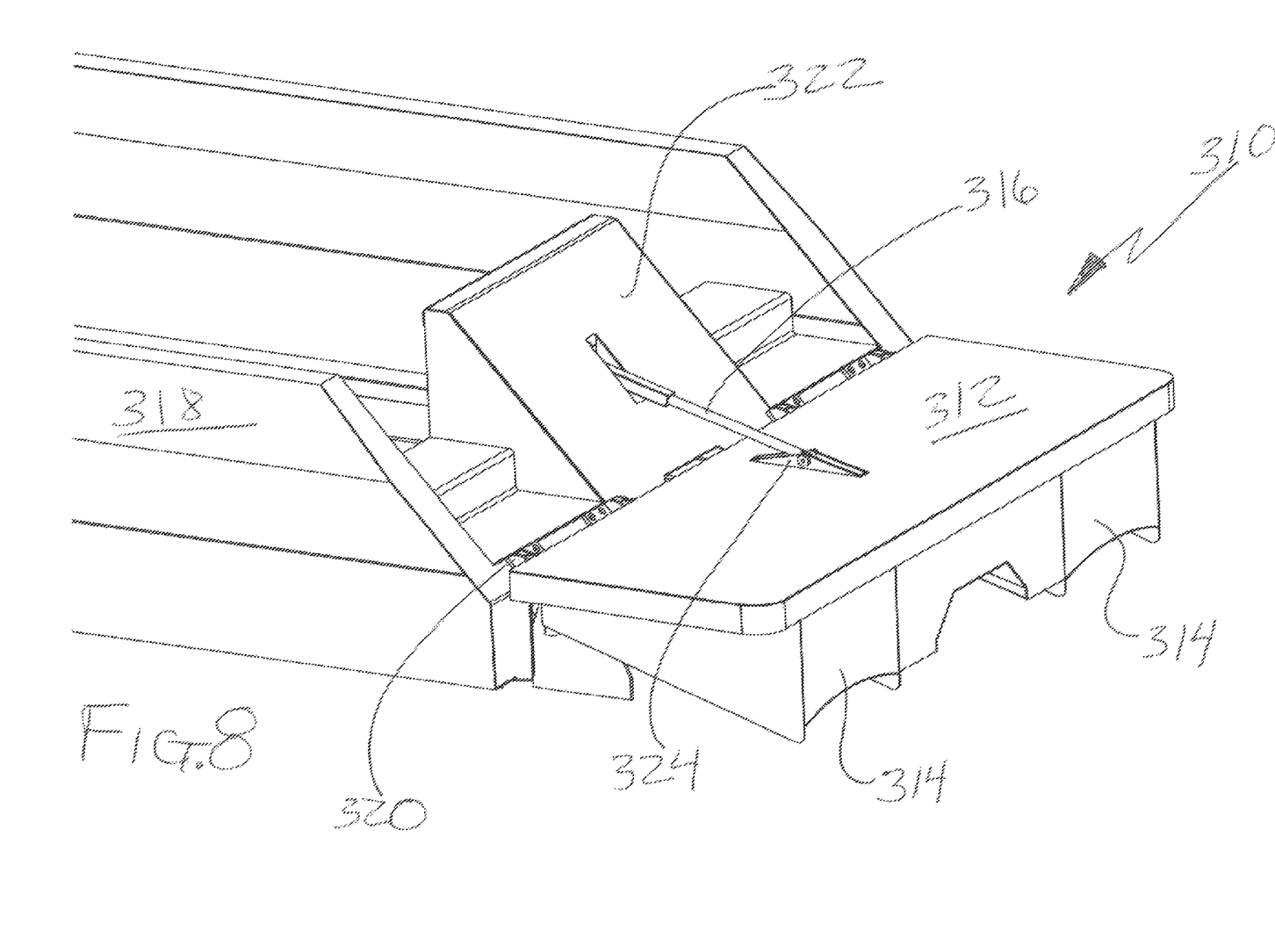
FIG. 8 is a side elevational perspective view of the diffuser gate made in accordance with the present invention in the down position.

Now, looking at FIG. 8, diffuser gate 310 is shown in its lower, extended position, ready to diffuse propeller spray when the vessel is underway. Transom platform 312 can also act as a swim platform in the down position shown in this figure. Hydraulic strut 316 is shown attached at its distal end by strut attachment 324 and emanating from linear actuator housing 322. Extending downwardly from platform 312 and two inverted gutters 314 to direct the propeller spray from each of the port and starboard tunnels (not shown in this figure). Diffuser gate 310 is hingeably mounted to transom of vessel 318 by hinges 320.

Figure 9:
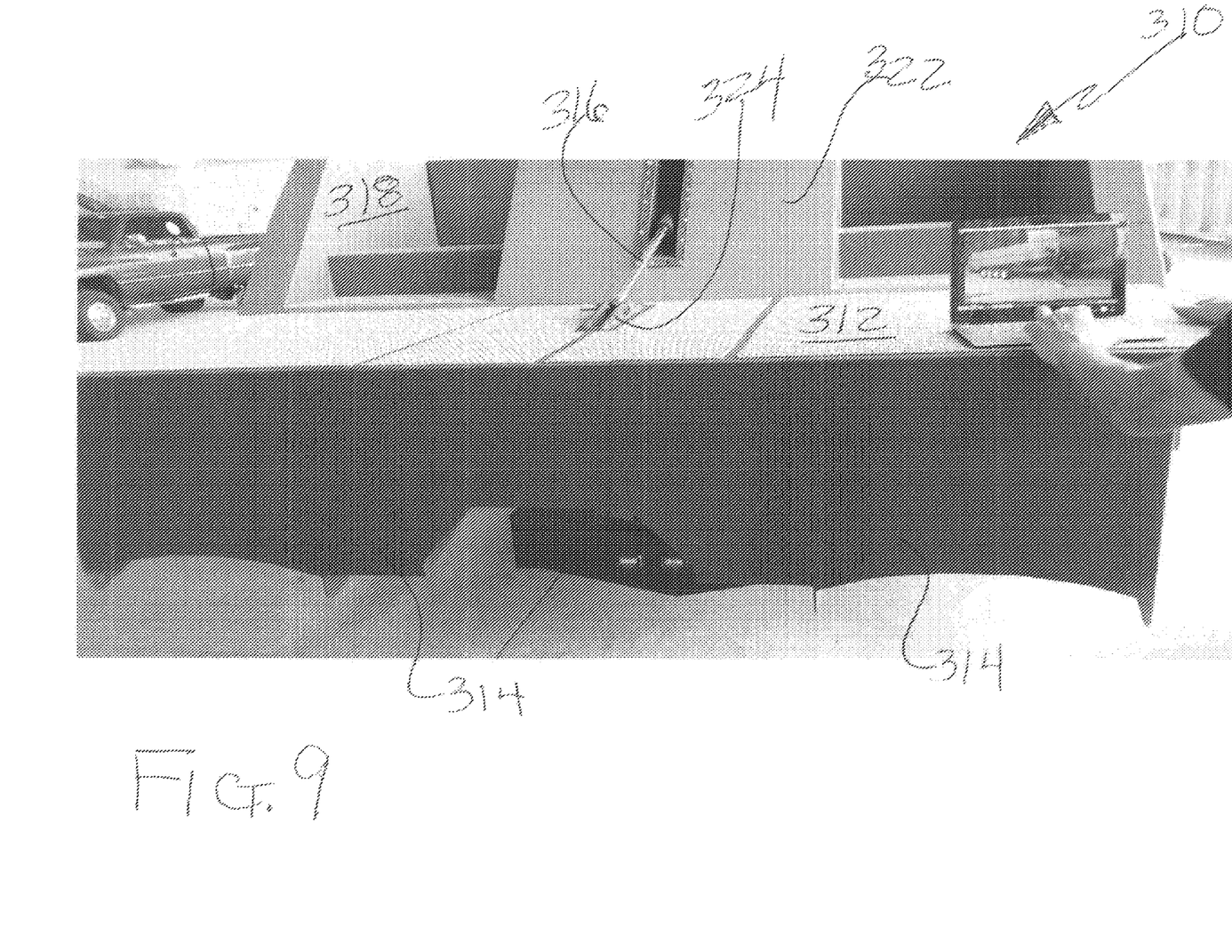
FIG. 9 is a rear elevational view of the diffuser gate in the down position.

FIG. 9 is a rear elevational view of diffuser gate 310 with platform 312 in its lowered position. Inverted gutters 314 are also shown extending downwardly from platform 312. Hydraulic strut 316 attached to strut attachment 324 act in cooperation with hinge pins (not shown here) by extending from linear actuator housing 322. Vessel 318 is thereby extended and ready for open waters. Diffuser gate 310 includes the elevating transom platform 312, that when in its elevated position, would be in stowaway mode, yet when lowered would utilize the half-cone shaped inverted gutters 314 to direct any propeller wash or rooster tail downward into the water, thus virtually eliminating visible propeller spray and reducing radar signature. Preferably, platform 312 is attached to vessel 318 with hinge pins 320 and utilizing an electric servo hydraulic linear actuator 322 to elevate and/or lower platform 312.

ELEMENT LIST

| 310 | Signature diffuser gate |
| 312 | Elevating transom platform |
| 314 | Inverted gutters |

| 316 | Hydraulic strut |
| --- | --- |
| 318 | Vessel |
| 320 | Hinge pins |
| 322 | Linear actuator housing |
| 324 | Strut attachment |

Figure 10:
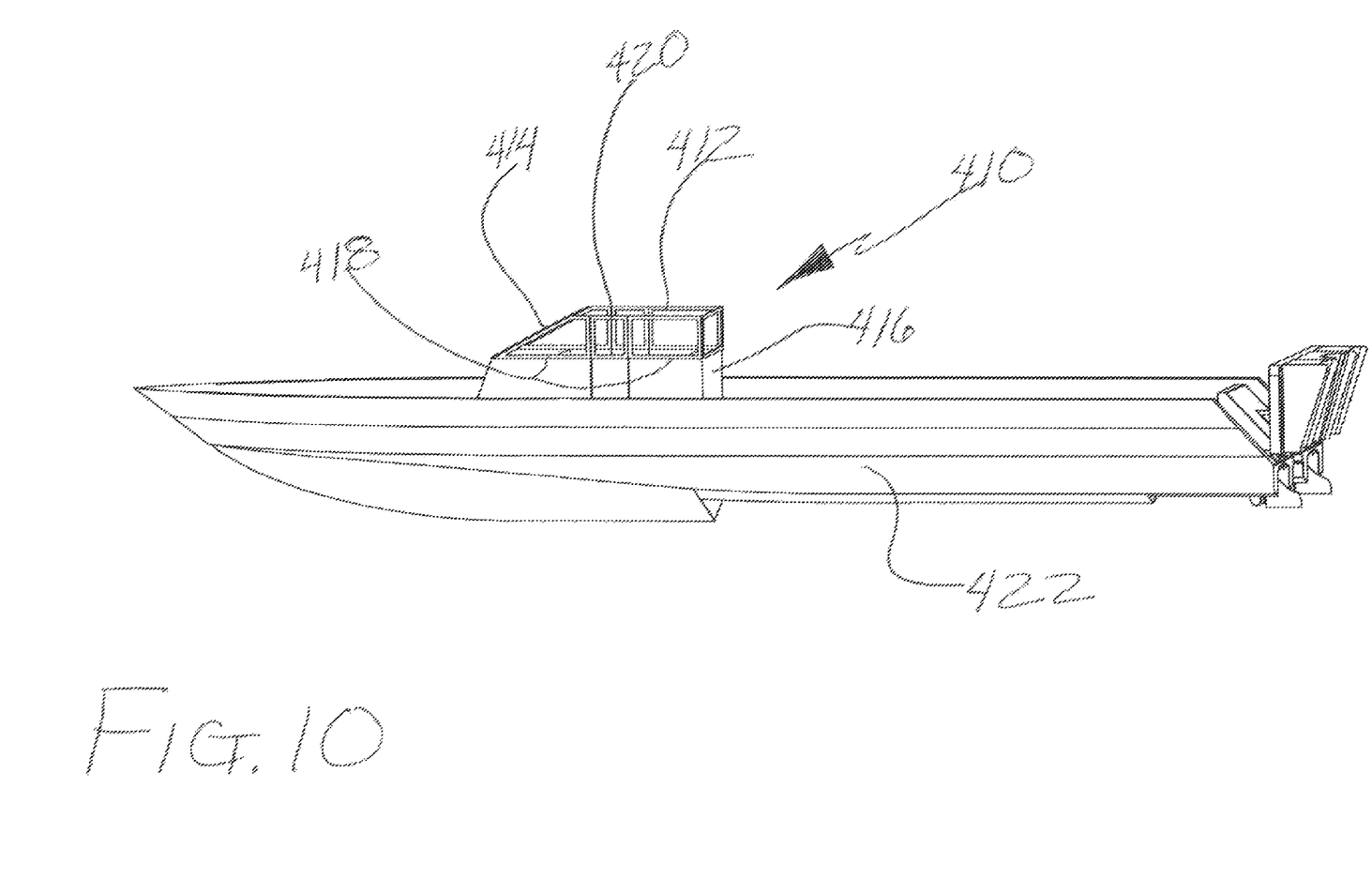
FIG. 10 is a side perspective view of the present marine vessel showing a cockpit/pilot house in the extended position.

FIG. 10 shows a retractable hideaway cockpit, generally denoted by numeral 410, including a retractable cockpit/pilot house 412 with at least one door 420 and a windshield 414 hingeably mounted to pilot house base 416 by hinges 418. The entire hideaway cockpit 410 is mounted inside the hull of vessel 422 and FIG. 10 illustrates hideaway cockpit 410 in its fully extended position.

Figure 11:
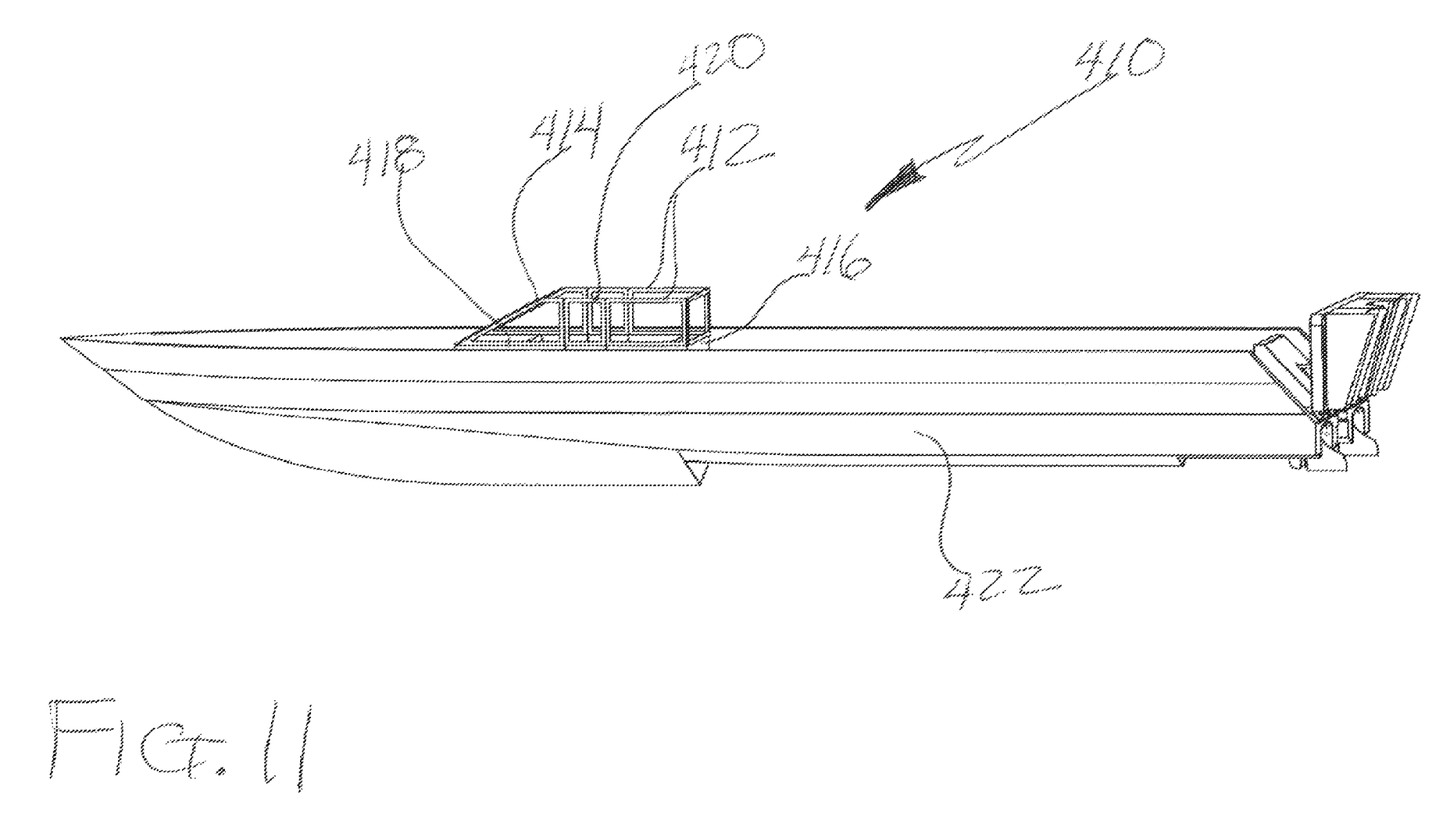
FIG. 11 is a side perspective view of the present marine vessel showing a cockpit/pilot house in the partially retracted position.

FIG. 11 shows the same retractable hideaway cockpit 410 but in a partially retracted position, as the pilot house base is no longer seen because it has been retracted partially. Again, pilot house 412 is the structural support for doors 420 and windshield 414 attached to pilot house base 416 by hinges 418.

Figure 12:
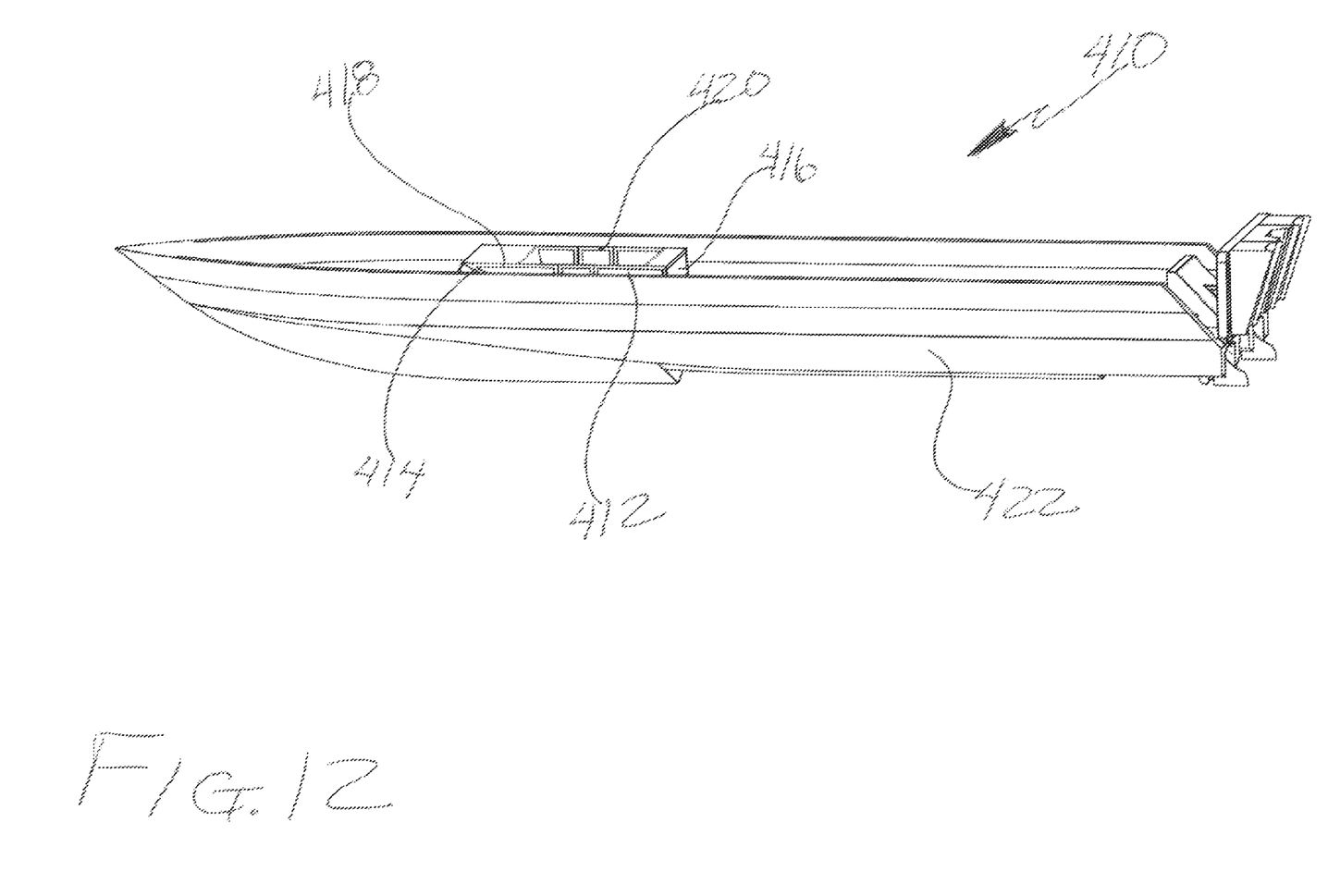
FIG. 12 is a side perspective view of the present marine vessel showing a cockpit/pilot house in the fully retracted position.

Looking next to FIG. 12, retractable hideaway cockpit 410 is shown in its fully retracted position. As can be seen in FIG. 12, pilot house 412 has been retracted so that it is beneath the gunnels of vessel 422. Windshield 414, doors 420 and pilot house structure 412 have been swung down on hinges 418 so that there is not structure above the gunnels.

Such a hideaway cockpit 410 can elevate and lower up or down into the deck of the hull of vessel 422 at various levels to either protect the operators from heavy seas, reduce hull profile and radar signature or to be fully lowered to allow another boat hull to be mounted thereon. In some applications, such as military applications, an advantageous feature would be to allow a second vessel hull mounted on top of another one for efficient transport in either a C-130 and a C-17 when the vessel is mounted on an on-road trailer with a type-V platform. When the second vessel is mounted on top of another vessel, the bottom vessel has the bow toward the front of the trailer, while the second mounted vessel is faced in the reverse. If the pilot house did not fully retract into the hull of the vessel, mounting the second vessel would not be possible.

Still looking at FIGS. 10 through 12, the pilot house 412 is shown as being comprised of four sides along with a bottom. The pilot house 412 may or may not include a hard top or a soft top or a hinged fold-down windshield. A linear actuator mounted to the hull keel with the other end mounted to the bottom of the pilot house provides an elevator means for elevating and lowering pilot house 412. In order to guide and stabilize the pilot house travel between an elevated and a lowered position, there are preferably mounting tracks attached to pilot house 412 and to the hull between the deck and the hull bottom in order to stabilize the up and down movement of pilot house 412.

Figure 13:
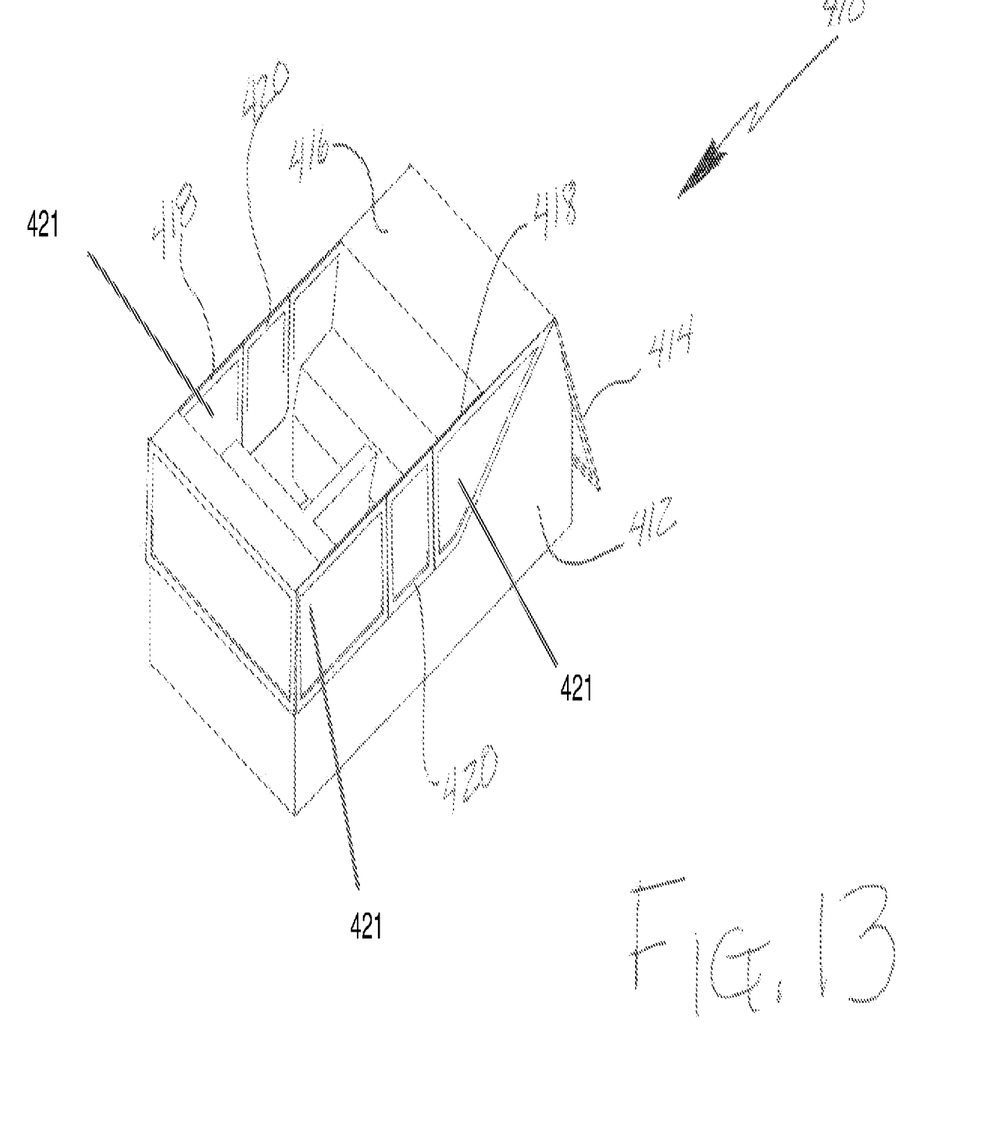
FIG. 13 is a top perspective view of the cockpit/pilot house in a fully extended view.

Looking now to FIG. 13 where similar element numbers are assigned to elements already shown in FIGS. 10-12, and wherein the retractable cockpit/pilothouse is generally denoted as numeral 410, a pilot house 412 is included with a windshield 414 hingeably mounted to the pilothouse body 412. A pilothouse base 416 includes a door 420 hingeably mounted to pilothouse 412. Hinges 418 allow side curtains 421 to be flipped down for full retraction of the pilothouse 412 into the hull of the vessel.

Figure 14A:
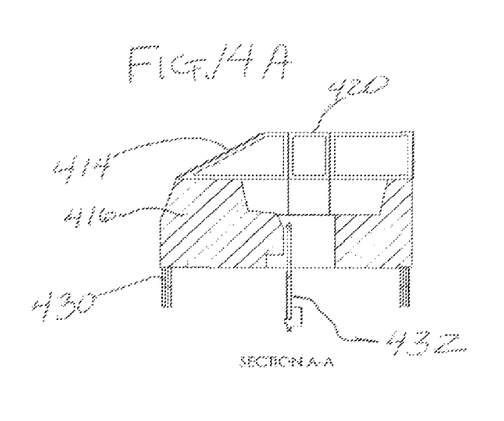
FIG. 14A is a side elevational view of the cockpit/pilot house in a fully extended view.
Figure 14B:
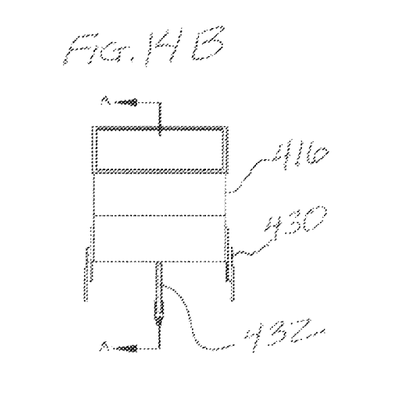
FIG. 14B is a front elevational view of the cockpit/pilot house in a fully extended view.
Figure 14C:
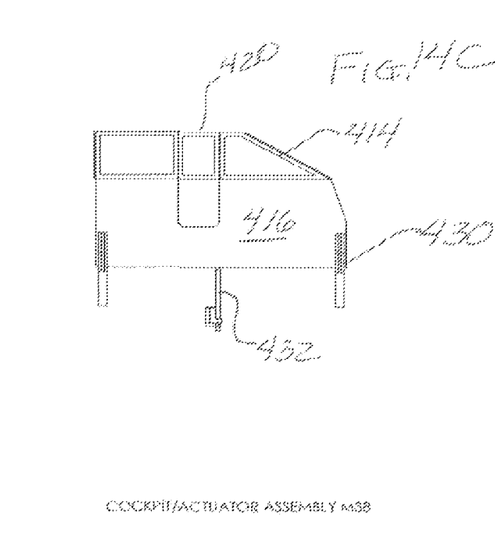
FIG. 14C shows a side elevational view of the cockpit/pilot house in a fully extended view from the other side showing a pilothouse door.
Figure 14D:
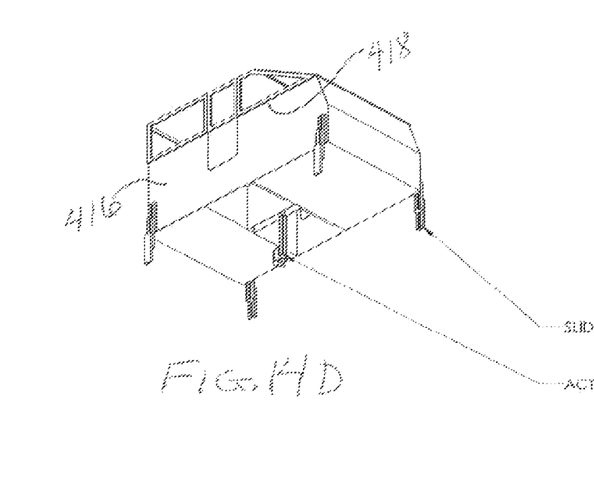
FIG. 14D is a top perspective cut-away view of the cockpit/pilot house in a fully extended view.
Figure 14E:
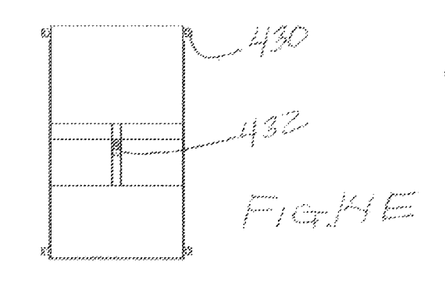
FIG. 14E illustrates sliding guides when view of the cockpit/pilot house in a fully extended view.

FIGS. 14A through 14E illustrate varying views of the retractable cockpit/pilothouse 410 as it is in motion during retraction. First, FIG. 14A illustrates pilot house 410 in a fully extended view as being supported by a vertical lifting system 430 having a linear actuator stabilizer 432. FIG. 14 B shows a front elevational view of the pilothouse in a semi-retracted position, including a partial extension of the vertical lifting system tracks 430 and the linear actuator stabilizer 432. FIG. 14C is an illustration taken along lines of Section A-A as shown in FIG. 14A. FIG. 14C shows a side elevational view with windshield 414 and door 420 in place on pilothouse body 412, again in a partially extended position by vertical lifting system 430. FIGS. 14D and 14E show a top perspective cutaway of the pilothouse 416 in the fully up extended view, distinguishable by sliding guides 430 and actuator 432 in a fully extended position. Relative position of linear actuator 432 can be seen best in FIG. 14E in the center of the pilothouse.

ELEMENT LIST

| 410 | Hideaway cockpit |
| --- | --- |
| 412 | Pilot house |
| 414 | Windshield |
| 416 | Pilot house base |
| 418 | Hinge |
| 420 | Door |
| 422 | Vessel |
| 430 | Vertical Lifting System Tracks |
| 432 | Linear Actuator |

In summary, numerous benefits have been described which result from employing any or all of the concepts and the features of the various specific aspects of the present invention, or those that are within the scope of the invention. The present marine vessel acts as a high-speed, stable vessel giving off a very low signature.

INDUSTRIAL APPLICABILITY

The present invention finds utility in the marine vessel arts and especially for military applications where a low signature vessel is required that is capable of high speeds and shallow draft requirements are present to reduce enemy detection.

What is claimed is:

1. A marine vessel having a hull with a transom, comprising: said marine vessel being adapted for stacking one on top of another for efficient transporting, including a retractable pilot house capable of being retracted down into the hull such that stacking one on top of another is possible; a retractable diffuser gate hingeably mounted to the transom of the marine vessel; an angled hull for radar detection, said hull having a v-hull configuration in the fore of the vessel and a catamaran configuration with sponsons at the aft portion of the hull; a bolt-on configuration of 3-sided pocket tunnel drive within said aft portion of the hull for replacement.

* * * * *